United States Patent [19]

Iwasa

[11] Patent Number: 4,633,670
[45] Date of Patent: Jan. 6, 1987

[54] SUPERCHARGING PRESSURE CONTROL DEVICE FOR AN EXHAUST GAS TURBOCHARGER

[75] Inventor: Yoshio Iwasa, Nagareyama, Japan

[73] Assignee: Nissan Motor Co., Ltd., Yokohama, Japan

[21] Appl. No.: 705,003

[22] Filed: Feb. 25, 1985

[30] Foreign Application Priority Data

Feb. 25, 1984 [JP] Japan .............................. 59-25231[U]

[51] Int. Cl.⁴ ............................................ F02B 37/12
[52] U.S. Cl. ................................ 60/603; 123/198 DB
[58] Field of Search ................. 60/600, 601, 602, 603; 123/198 DB; 415/144, 145, 151

[56] References Cited

U.S. PATENT DOCUMENTS 2,944,786  7/1960  Angell et al. .
4,177,006  12/1979  Nancarrow ........................ 60/602 X
4,387,571  6/1983  Katsumata et al. .................... 60/602

FOREIGN PATENT DOCUMENTS 18522    2/1983  Japan ..................................... 60/602
1277020  6/1972  United Kingdom ........ 123/198 DB Primary Examiner—Michael Koczo
Attorney, Agent, or Firm—Schwartz, Jeffery, Schwaab, Mack, Blumenthal & Evans

[57] ABSTRACT

A supercharging pressure control device for an exhaust gas turbocharger comprises a bypass valve control device which effectively controls the supercharging pressure to correspond to the load on an internal combustion engine when the supercharging pressure downstream from a compressor is higher than a first set value. Further, a velocity control device for exhaust gas flow is positioned between the inlet port of the bypass valve control device and the exhaust gas turbine to control the exhaust gas flow velocity when the supercharging pressure downstream from the compressor exceeds a second set value which is lower than the first set value. A pressure sensor is installed in the downstream side of the compressor in the intake air channel to detect the supercharging pressure. A controller comprising a microcomputer is also provided. Several types of detection means output operating status signals to the controller. A fuel supply means comprising an injection valve is provided. Finally, when the controller detects that the supercharging pressure is above a third set value which is higher than the first and second set values, a fuel shutoff means cuts off the fuel supply from the fuel supply devic, and when this fuel shutoff means determines that the supercharging pressure is below a fixed supercharging pressure lower limit value, it causes the fuel supply means to recommence supplying fuel.

13 Claims, 7 Drawing Figures

SUPERCHARGING PRESSURE CONTROL DEVICE FOR AN EXHAUST GAS TURBOCHARGER

BACKGROUND OF THE INVENTION

1. Field of the Invention

The present invention relates to a supercharging pressure control device for an exhaust gas turbocharger which supercharges the intake air to an internal combustion engine by driving a compressor together with an exhaust gas turbine in a rotating manner through use of the exhaust gas energy of the internal combustion engine.

2. Description of the Prior Art

Conventionally, an internal combustion engine with an exhaust gas turbocharger utilizes the energy of the exhaust gas to supercharge the intake air and supply it to the internal combustion engine. Consequently, the intake air charging efficiency is increased, which makes it possible to increase the fuel injection volume contributing greatly to increased output. However, if the supercharging pressure becomes excessive, an excessive stress is imposed on the internal combustion engine and on its intake and exhaust gas system with the attendant risk of damage or destruction. Accordingly, many means have been developed to prevent an excessive increase in supercharging pressure.

An example of one of these prevention means is a velocity control device for exhaust gas flow which is described in U.S. Pat. No. 2,944,786. In this device, a control valve is provided at the intake port section for exhaust gas in the exhaust gas turbocharger. By adjusting the degree of opening of the control valve, the velocity of the exhaust gas flow in the inlet port to the exhaust gas turbine is controlled, thereby preventing the excessive rotation of the exhaust gas turbine. Consequently an excessive increase in supercharging pressure otherwise caused by the compressor is generally prevented, while the exhaust gas flow velocity in a light or lower load range of operation is increased to increase the supercharging pressure and therefore the output in the lower load range.

Another example of such conventional prevention means is a bypass channel for connecting the upstream and downstream sides of the exhaust gas turbine, and the bypass channel is provided with a bypass control valve which opens when the supercharging pressure in the bypass channel on the downstream side of the compressor goes above a set value. When the supercharging pressure on the downstream side of the compressor exceeds a specified value, the bypass valve control device opens and the energy of the exhaust gas is exhausted to the outside through the bypass channel so that it will not act to rotate the exhaust gas turbine. This prevents excessive rotation of the exhaust gas turbine, thus preventing an excessive increase in the supercharging pressure.

The velocity control device for exhaust gas flow and the bypass valve control device can effectively carry out supercharger pressure control, but the following types of inconveniences still remain.

Specifically, with the velocity control device for exhaust gas flow, when the supercharging pressure exceeds the set value, the cross-sectional area of the exhaust gas inlet port is enlarged to decrease the flow velocity of the exhaust gas introduced into the exhaust gas turbine. But the full volume of exhaust gas is all introduced into the exhaust gas turbine and not bypassed, so that when the exhaust gas energy is further increased, the rotational speed of the exhaust gas turbine will go beyond control and the supercharging pressure is ultimately increased. In other words, a drawback of the velocity control valve is in insufficient flexibility of operation. Specifically, since the original design specifications of the exhaust gas turbocharger must ensure that the increase of supercharging pressure is below the allowable value, the overall torque characteristics must be generally set for a low supercharging pressure throughout engine operation, including the time that the engine is running under lower load. However, this results in a supercharging pressure in the lower load region which is unduly reduced, making it difficult to improve the output characteristics in this operating region.

Now turning to the bypass valve control device, when the supercharging pressure is about to exceed the set point, the exhaust gas is introduced into the bypass channel by the bypass control valve means, and is excluded from the region of rotation of the exhaust gas turbine. It therefore functions as an effective means of preventing an excessive increase in the supercharging pressure. However, the torque characteristics determined by the specifications of the exhaust gas turbocharger are constant, and simply act to cut excessive supercharging pressure, which does not solve the problem of low supercharging pressure in the low load region. It should be further noted that with such a bypass control device, immediately after the bypass control valve is opened, the exhaust gas turbine rotates at a relatively excessive speed due to the effect of its inertia, causing insufficient reduction of the supercharging pressure, resulting in the production of knocking. The back pressure is precipitously lowered, giving rise to the fear that the catalytic device in the exhaust system could be damaged.

In addition, it was found out that when either of these devices is used separately, if the degree of valve-opening remains small and operation becomes impossible because of a breakdown or seizure, the exhaust gas turbine and compressor rotate at an abnormally high rate and the supercharging pressure increases excessively, so that knocking could develop or engine damage could result.

Further, the energy of the exhaust gas may be large beyond the capability of these devices, which needs the fuel supply to stop.

Therefore, these prevention devices as mentioned above must be further improved, and development is still required in the gas intake system for supercharging in order to maintain flow flexibility and pressure variability throughout operation.

SUMMARY OF THE INVENTION

An object of the present invention is to provide a supercharging pressure control device having its flow flexibility and pressure variability improved throughout operation.

Another object of the present invention is to provide a supercharging pressure control device for an exhaust gas turbocharger which is capable of improving the output characteristics of an internal combustion engine by making the supercharging pressure high enough when running in a lower load range of operation while preventing an excessively large supercharging pressure throughout operation.

Another object of the present invention is to provide a supercharging pressure control device for an exhaust gas turbocharger which is capable of carrying out supercharging pressure control when the supercharging pressure is changed from the higher side to the lower side and vice versa.

Another object of the present invention is to provide a supercharging pressure control device for an exhaust gas turbocharger which is capable of reliably preventing the excessive supercharging pressure and further improving the protection of the engine.

Another object of the present invention is to provide a supercharging pressure control device for an exhaust gas turbocharger comprising a velocity control device for exhaust gas flow and a bypass control valve means in which the bypass control valve means makes up for the mulfunction of the velocity control device.

Another object of the present invention is to provide a supercharging pressure control device for an exhaust gas turbocharger comprising a velocity control device for exhaust gas flow and a bypass control valve means in which the velocity control device functions before the bypass control valve means does.

Another object of the present invention is to provide a supercharging pressure control device for an exhaust gas turbocharger comprising a velocity control device for exhaust gasflow and a bypass control valve means in which the fuel suply to the engine can be stopped in an extremely excessive supercharging condition.

Briefly described, these and other objects of the present invention are accomplished by the provision of an improved supercharging pressure control device for an exhaust gas turbocharger comprising a bypass control valve means communicating the upstream and downstream sides of the exhaust gas turbine; a velocity control device for exhaust gas flow to control the input gas flow of the exhaust gas turbine, a control means for controlling the velocity control device and bypass control valve means such that the velocity control device is opened at a predetermined pressure value smaller than that of the bypass control valve means, and a fuel cutoff means to cut off the fuel supply to the internal combustion engine in correspondence with a pressure sensor positioned on the downstream side of the compressor to detect the supercharging pressure.

BRIEF DESCRIPTION OF THE DRAWINGS

These and other objects, features and advantages of the present invention will become more apparent from the following description of a preferred embodiment taken in conjunction with the accompanying drawings, in which:

FIG. 7 is a flow chart which explains the operation of the exhaust gas flow control valves.

DESCRIPTION OF THE PREFERRED EMBODIMENT

Figure 1:
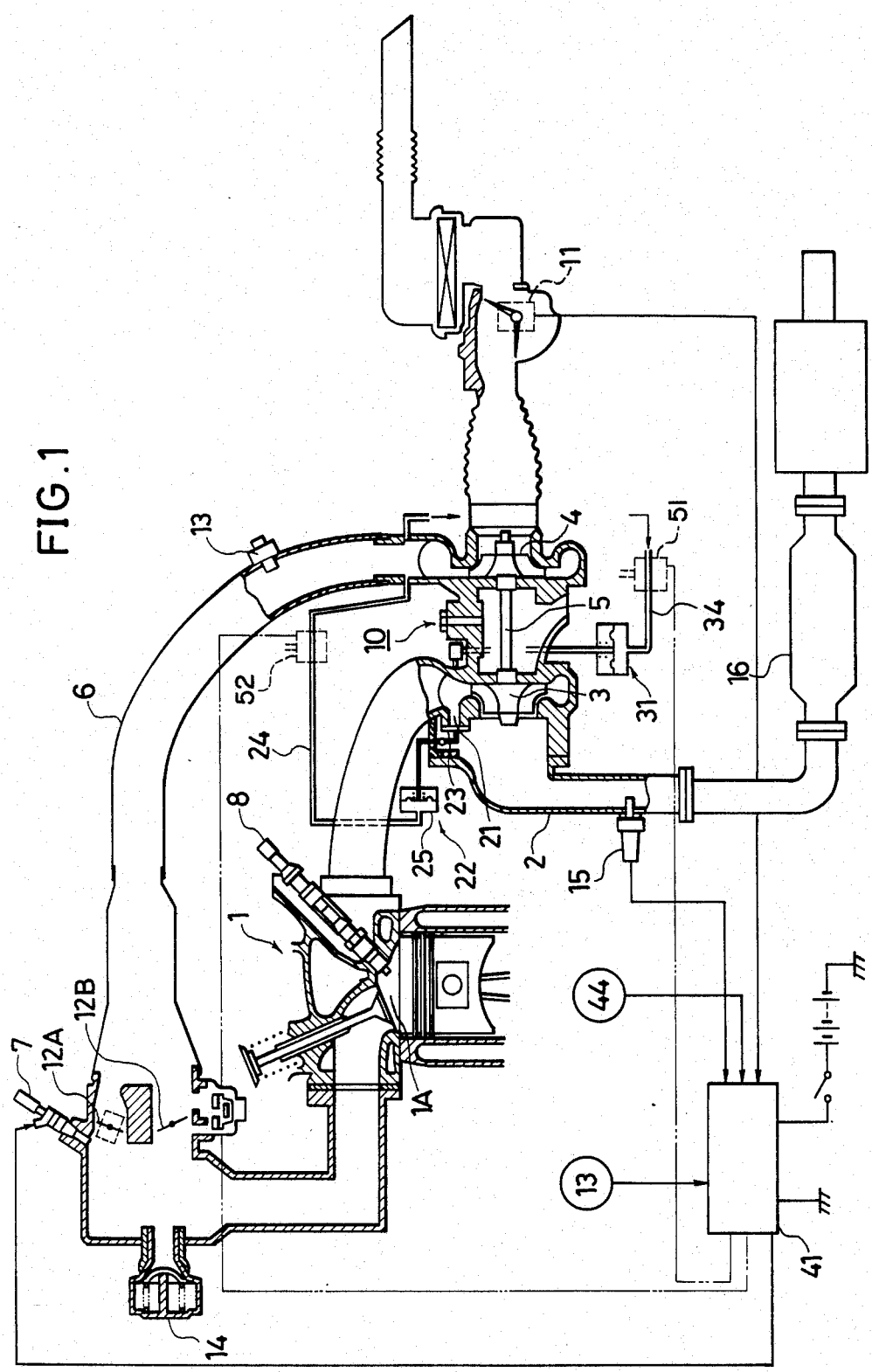
FIG. 1 is a structural drawing on one embodiment of a supercharging pressure control device of a turbocharger according to the present invention.

Referring to FIG. 1, in one embodiment of the present invention, an exhaust gas turbocharger 10 is positioned in an exhaust gas channel 2 and comprises an exhaust gas turbine 3 which discharges the exhaust gases of combustion from an internal combustion engine 1 to the atmosphere, and a compressor 4 which is linked to the exhaust gas turbine 3 by a shaft 5. The compressor 4 supercharges the intake air and supplies it to the internal combustion engine 1. That is, the exhaust gas turbine 3 is rotatingly driven together with the compressor 4, causing the intake air to be supercharged by the compressor 4.

Fuel is injected to an intake air channel 6 by an injection valve 7 together with the intake air into a combustion chamber 1A where the mixture is burned. An air flowmeter 11 is provided on the upstream side of the compressor 4 in an air intake channel 6. A plurality of intake air throttle valves 12A and 12B, which control the quantity of intake air, are positioned between the compressor 4 and the injection valve 7. A pressure sensor 13 which detects the supercharging pressure is positioned between the intake air throttle valve 12A and the compressor 4. A relief valve 14 is provided on the downstream side of the intake air throttle valve 12A to relieve excessive pressure by opening the intake air throttle valve 12A when the supercharging pressure on the downstream side of the valve 12A exceeds an allowable pressure. The pressure at which the relief valve 14 opens is set higher than that at which a bypass control valve means 22 opens, which will be later described. In addition, an oxygen sensor 15, which detects the density of oxygen in the exhaust gas, and a catalytic deivce 16, which removes any substances in the exhaust gas such as unburned components, are provided on the downstream side of the turbine 3 in the exhaust gas channel 2.

In this embodiment of the present invention, the bypass control valve means 22 is provided in the bypass channel 21, which urges the exhaust gas to bypass the exhaust gas turbine 3, and a velocity control device 31 for exhaust gas flow is provided in the exhaust gas channel 2 between the inlet port of the bypass channel 21 and the exhaust gas turbine 3 preferably in the inlet port section of the exhaust gas turbine 3.

Figure 2:
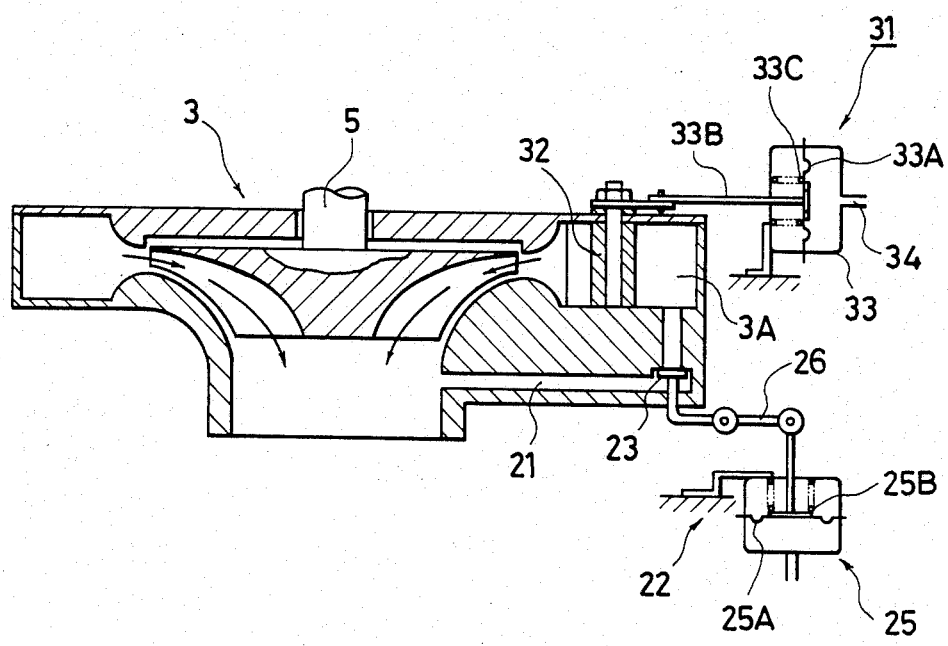
FIG. 2 is a side view of the exhaust gas turbine section of the embodiment in FIG. 1.
Figure 3:
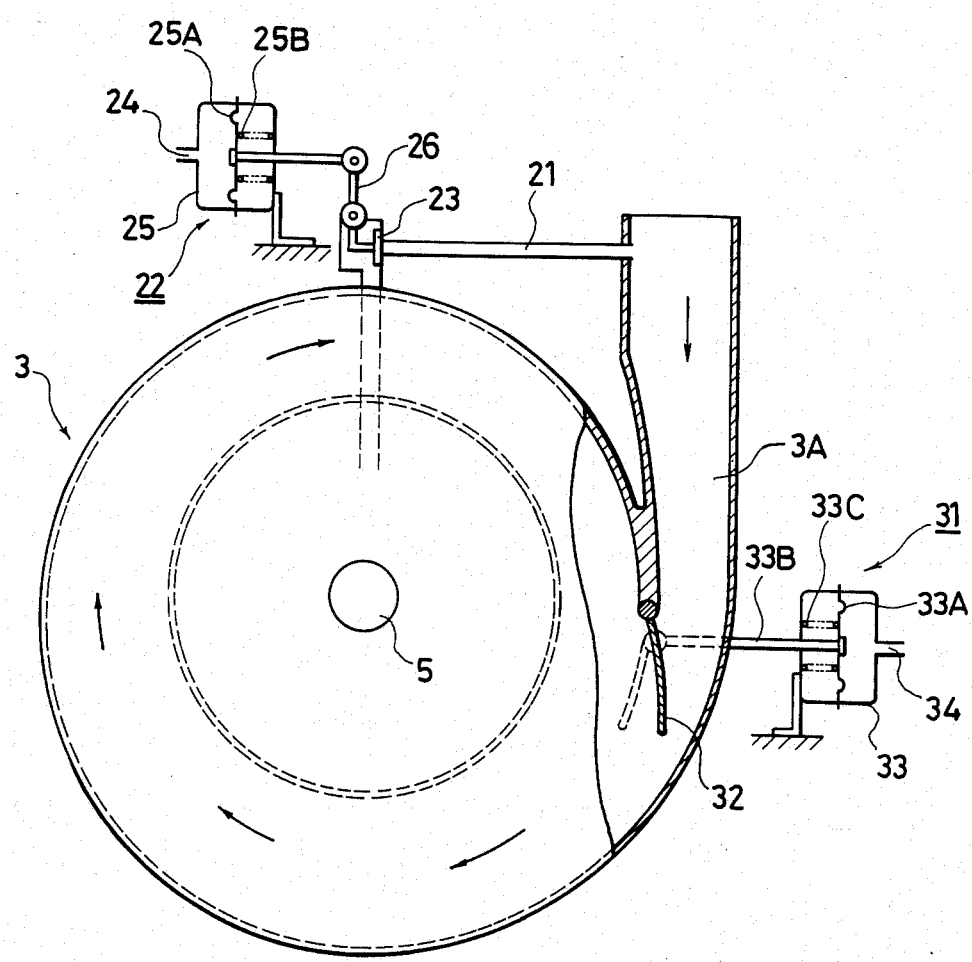
FIG. 3 is a vertical section drawing of the exhaust gas turbine section of FIG. 2.
Figure 4:
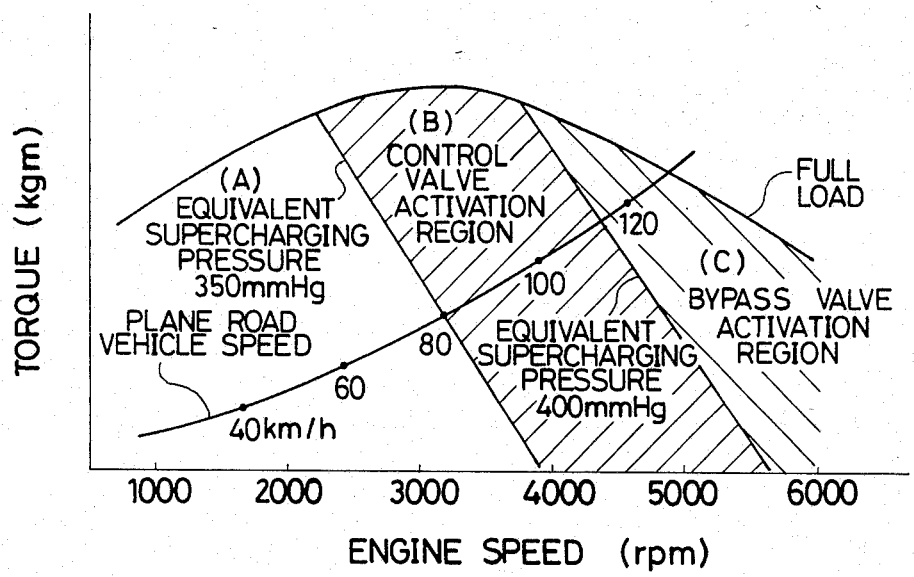
FIG. 4 is a characteristic diagram showing the relation between the RPM and torque of the internal combustion engine in each operating region of the exhaust gas flow velocity control valve and bypass control valve according to the present invention.

In the bypass control valve means 22, as indicated in FIG. 2 and FIG. 3, a bypass valve 23 for opening and closing the bypass channel 21 is connected through a link 26 with a diaphragm 25A of a diaphragm device 25 into which the supercharging pressure on the upstream side of the intake air throttling valve 12a and on the downstream side of the compressor 4 is introduced through the pressure channel 24. Accordingly, when the supercharging pressure, now designated by P, is on the point of exceeding a first set value Pb (for example, Pb=400 mm Hg as shown in FIG. 4), the diaphragm 25A opposes the force in the closing direction of a spring 25B to increase the opening of the bypass valve 23 of the bypass control means 22.

The exhaust gas flow velocity device 31, as indicated in FIG. 2 and FIG. 3, has a throttle valve 32 provided in the inlet portion section of the exhaust gas turbine 3. The upstream end of the throttle valve 32 is pivotally supported by the casing of the inlet port section of the exhaust gas turbine 3, and when its downstream free end is displaced so as to reduce the cross-sectional area of the inlet port section 3A (indicated by the solid lines in FIG. 3), the flow velocity of the exhaust gas increases. On the other hand, when the downstream end of the throttle valve 32 is displaced so as to increase the cross-sectional area of the inlet port section 3A (as indicated by the dotted lines in FIG. 3), the flow velocity of the exhaust gas decreases.

The throttle valve 32 is connected to the diaphragm 33A of the diaphragm device 33 by a rod 33B. The supercharging pressure upstream of the intake air throttle valve 12A and downstream of the compressor 4 is introduced through the pressure channel 34 into the diaphragm device 33, and when the supercharging pressure P is at the point of exceeding a second set value Pa (for example, 350 mm Hg as shown in FIG. 4), the elastic force of a spring 33C is overcome by the supercharging pressure on the diaphragm 33A, and the downstream free end of the throttle valve 32 is displaced in the direction to increase the cross-sectional area of the inlet port section 3A, thereby decreasing the flow velocity of the exhaust gas. It should be noted that the first set value Pb is larger than the second set value Pa.

The fuel supply means in this embodiment of the present invention, as shown in FIG. 1, comprises the injection valve 7, a controller 41 which controls the injection valve 7, and a plurality of detection means which output operating status signals to the controller 41. The controller 41 may be a microcomputer which comprises input and output processing means, a CPU device and a memory means. The controller as shown in FIG. 5 comprises input and output processing means 42, 46 and 50, a valve-opening operation or calculating means 49, a basic fuel volume operation or calculating means 43, and an injection correction means 48, a fuel cut-off discrimination means 45 together with a memory means including a memory 47.

In addition, the detection means comprises a pressure sensor 13 which outputs the supercharging pressure P on the downstream side of the compressor 4, an RPM sensor 44 for detecting the RPM N of the internal combustion engine 1 (which will not be described here in detaol), an air flowmeter 11 which detects the volume Q of the intake air, and an oxygen sensor 15 which outputs an oxygen density signal which bears a close relationship to the air/fuel ratio. The controller 41 predicts the most appropriate value for the operating conditions at that time, reads out the control set point which is recorded in memory, and carries out operations. The controller 41 then issues instructions to the injection valve 7 for the opening/closing timing ratio for injection of the most appropriate volumes.

Figure 5:
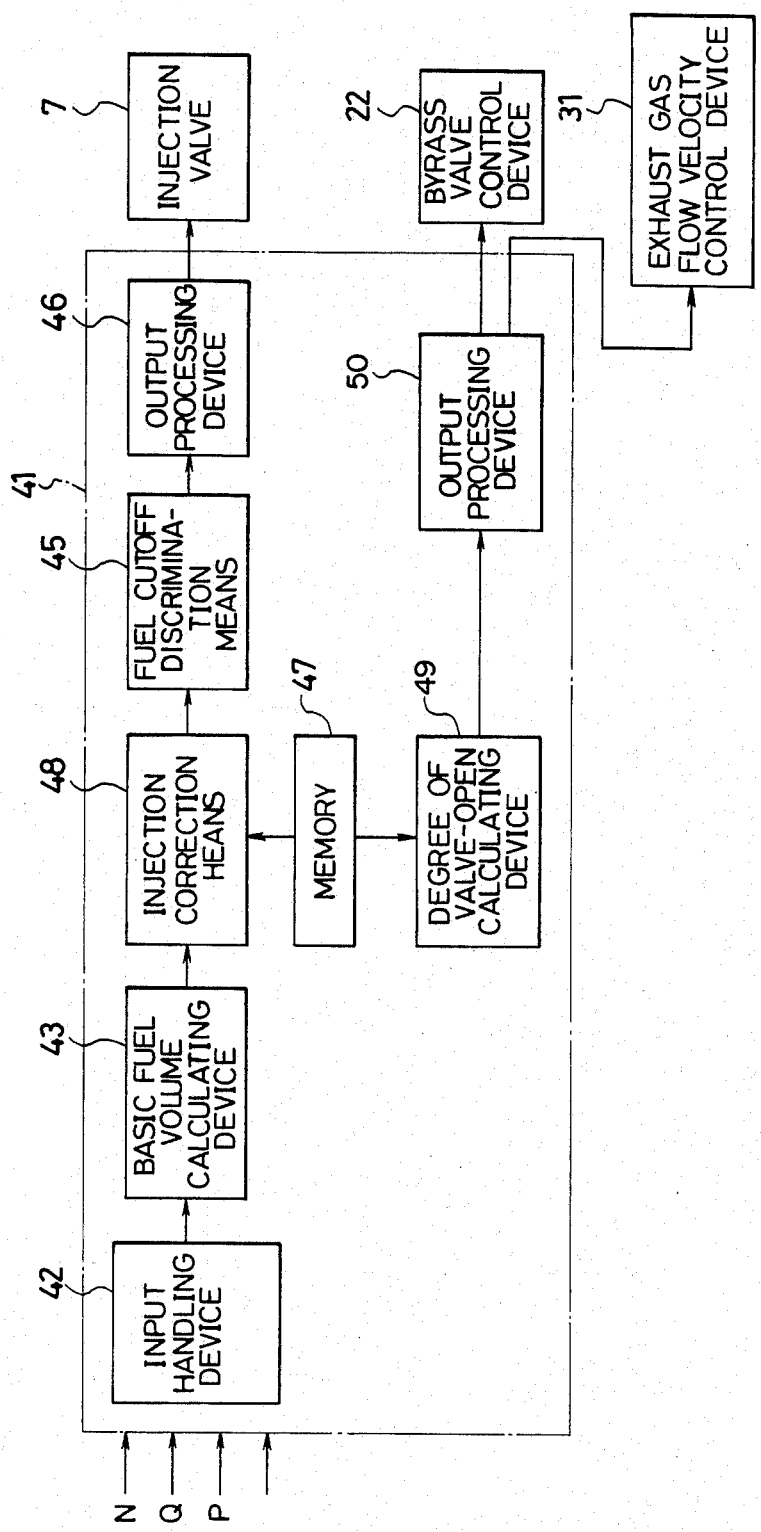
FIG. 5 is a block diagram of the controller in FIG. 1.

The controller 41 is provided with a fuel cutoff discrimination means as illustrated in FIG. 5. When the pressure sensor 13 detects an upper limit Pmax of supercharging pressure (for example, 450 mm Hg) above a third set value, it stops the action of the fuel injection means to cut off the supply of fuel from the injection valve 7. When the supply of fuel is cut off, the rate of rotation of the engine and therefore supercharging pressure is decreased. The supply of fuel recommences once the pressure has dropped about 50 mm Hg below the upper limit supercharging pressure Pmax, that is, to a value Pmin between the first and second set values Pa and Pb.

Next the operation of this device will be described.

Under normal operating conditions, the intake air is compressed by the compressor 4, and its volume is adjusted by the air intake throttle valves 12A and 12B. The fuel is then injected into the engine by the injection valve 7 and mixed with the intake air to form a gaseous fuel mixture. The mixture is then introduced into the combustion chamber 1A of the internal combustion engine 1 and ignited by an ignition plug 8. The gases of combustion are discharged into the exhaust gas channel 2 and their flow velocity is controlled by the velocity control device 31 for exhaust gas flow. This exhaust gas rotatingly drives the exhaust gas turbine 3, which in turn rotatingly drives the compressor 4 which is coupled to the same shaft. This causes the exhaust gas to be expelled to the atmosphere. The velocity control device 31 for exhaust gas flow throttles to cause an increase in the flow velocity so that even at low load, in other words, with a low exhaust gas volume, the rotational driving energy of the exhaust gas turbine 3 is comparatively large, and a drop in the supercharging pressure force is prevented.

Here, when the RPM of the engine increases, so that a large volume of exhaust gas is discharged, the rotation of the exhaust gas turbine 3 increases due to the increased energy of the exhaust gas. In concert with this, the compressor 4 also reaches a high rotational speed so that the supercharging pressure on the downstream side increases.

When this supercharging pressure goes above the set pressure Pa at which the velocity control device 31 for exhaust gas flow opens, the supercharging pressure Pa is introduced into the diaphragm device 33. This causes the throttle valve 32 to overcome the elastic force of the spring 33C. As a result, the throttle valve 32 is moved from the position depicted by the solid lines in FIG. 3 to the position indicated by the broken lines. The cross-sectional area of the opening of the inlet port section 3A therefore increases and the exhaust gas flow rate is reduced. Because of this, an increase in the rotational velocity of the exhaust gas turbine 3 is restricted, and excessive supercharging of the intake air is avoided. At the same time, the pressure in the exhaust gas channel 2 on the upstream side of the exhaust gas turbine 3 (back pressure) is decreased, the pumping loss of the internal combustion engine 1 is decreased, and a decrease in output is prevented.

Furthermore, in the case where the internal combustion engine 1 is operating at high speed and high load, because the volume of exhaust gas discharged from the engine is large, even when the velocity control device 31 for exhaust gas flow calls for full opening of the valve, the whole volume of the exhaust gas is used to drive the exhaust gas turbine 3, so that the exhaust gas turbine 3 and also the compressor 4 rotates at high speed to increase the supercharging pressure until it exceeds the valve-opening set value Pa. At this time, the supercharging pressure increases to the valve-opening pressure Pb of the bypass valve control device 22, upon which the supercharging pressure is introduced into the diaphragm device 25 to force the diaphragm 25A to overcome the elastic force of the spring 25B, thereby opening the bypass valve control device 23 through the medium of the link 26.

For this reason, the exhaust gas in the exhaust gas channel 2 on the upstream side of the exhaust gas turbine 3 is introduced to the downstream side of the exhaust gas turbine 3 through the bypass channel 21. As a result, the high speed rotation of the exhaust gas turbine 3 and the compressor 4 is reduced, excessive supercharging pressure is avoided, and the durability of the shaft 5 is improved. In addition, the development of knocking in the internal combustion engine 1 is prevented, and damage to the main body of the engine and its intake and exhaust systems is also prevented. In this way, the action of the exhaust gas for turbocharging is utilized to the maximum, and the output characteristics of the engine are improved.

When the engine rotates at a further higher speed and load, the supercharging pressure may further increase beyond the capability of preventing excessive supercharging pressure. However, in this case, the bypass valve control device 22 takes over this prevention function. Accordingly, with the velocity control device 31 for exhaust gas flow, there is no worry of inconvenience otherwise caused by the supercharging pressure increasing above this pressure value set for valve-opening. An exhaust gas turbocharger can be designed so that the supercharging pressure desirably increases over all operating regions, wherein by keeping enough supercharging pressure in the lower load region, it is possible to upgrade the torque characteristics.

However, if the pressure for valve opening is set at the same value both for the bypass valve control device 22 and the velocity control device 31 for exhaust gas flow (that is, Pa=Pb), or if the bypass valve control device 22 is mounted independently, immediately after the bypass control valve 23 is opened, the exhaust gas turbine 3 which had been rotating up to that time, rotates relatively excessively from inertia, and the responsibility to the lowering of the supercharging pressure worsens. For this reason, there is concern that knocking will be produced, or that the back pressure will suddenly drop, damaging the catalytic device in the exhaust gas system. However, in the present invention, the throttle valve 32 of the velocity control device 31 for exhaust gas flow is opened before the bypass control valve 23 is opened, so that the frequency of use of the bypass control valve 23 becomes small, and it becomes possible to almost eliminate the above-mentioned inconveniences. At the same time, it is possible to improve durability of the bypass control valve, to stabilize this valve-opening pressure setting, and to improve the maintenance of the engine.

In addition, the intake port from the bypass channel 21 of the bypass valve control device 22 is provided upstream of the throttle valve 32 of the velocity control device 31 for exhaust gas flow. From this arrangement, in the case where damage or seizure occurs before the velocity control device 31 reaches the fully open position, the bypass control valve 23 supplements the deficiency by opening further, and the exhaust gas flows into the bypass channel 21 upstream of the bypass control valve 23. As a result, an excessive rise in the supercharging pressure is prevented, thus protecting the engine.

Furthermore, the throttle valve of the velocity control device 31 for exhaust gas flow is easily made to vibrate by the pulsating pressure force 3 which activates it. To prevent this, the pressure receiving area of the diaphragm 33A is made sufficiently large, so that even if the throttle valve 32 is about to vibrate as a result of the pulsating pressure, it is maintained in a fixed position by the diaphragm 33A. In addition, the velocity control device 31 for exhaust gas flow is fully open when the bypass valve control device is opened at the predetermined pressure. However, it is acceptable if the control region of the bypass control valve and the control region of the velocity control device 31 more or less overlap.

In the case where the RPM of the engine increases such that in spite of the fact that both of the velocity control device 31 and the bypass valve control device 22 are opened fully, the supercharging pressure appears to be still rising, the further supply of fuel is dangerous from the aspect of protecting the engine. Because of this, in the case where the pressure sensor 13 detects the upper limit of the supercharging pressure Pmax, a fuel injection action of the injection valve 7 is cut off by the action of the controller 41.

As a result, the volume of exhaust gas discharged by the internal combustion engine 1 immediately decreases, and the excessive rotation of the exhaust gas turbocharger 10 is avoided, so that the supercharging pressure is reduced and the engine 1 is reliably protected. After its stoppage, the fuel supply does not recommence until the supercharging pressure declines to the lower limit supercharging pressure Pmin (<Pb) out of the control range of the bypass control valve means 22. Therefore, the operation and protection of the engine are greatly improved.

In this way, by means of a fuel cutoff, the lowering of the maximum supercharging pressure is reliably carried out, so that both of the pressure set values Pa and Pb of the bypass valve control device 22 and the velocity control device 31 can be set relatively higher. By increasing the supercharging pressure of the exhaust gas turbocharger 10 over all operating regions, especially in the low load operating region where the output quickly becomes inadequate, the torque characteristics can be upgraded.

The lower limit Pmin of supercharging pressure where the fuel is resupplied after the cutoff, may be in aggreement with the upper limit Pmax of supercharging pressure, but if the supply is recommenced immediately after the fuel supply is cut off, the control stability worsens, so that it is advisable to set $P_{min}$ lower than Pmax. At this time, the lower pressure limit Pmin may be higher than pressure Pb, but it is possible to have smoother supercharging pressure control by using the bypass valve control device 22 and the velocity control device 31 than by stopping fuel supply. It is therefore desirable if the lower pressure limit Pmin be lower than the valve-opening pressure Pb.

Figure 6:
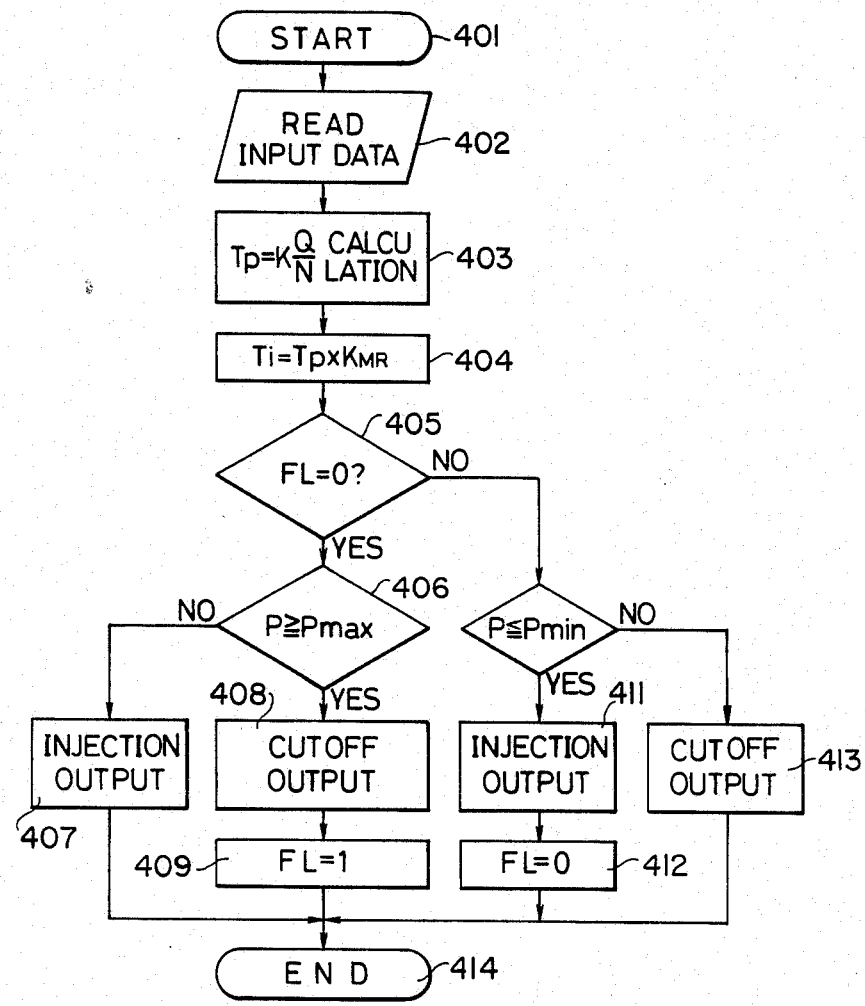
FIG. 6 is a flow chart which explains the operation of the controller illustrated in FIG. 1.

Next, we will explain the action of the fuel supply means and the fuel stoppage means with reference to FIG. 5 and FIG. 6.

The flowchart starts at Step 401. In Step 402 the reading of the input data is performed. That is, the engine status signals, such as the intake air volume Q from the air flowmeter 11, the engine RPM from the engine rotation sensor 44, the supercharging pressure P from the pressure sensor 13, and the oxygen density from the oxygen sensor, are inputted to the input processing device 41 of the controller 42.

Next, in Step 403, the intake air volume for one revolution of the engine 1 is calculated by the basic fuel volume operation means 43 in accordance with the equation of the basic fuel volume TP=K×Q/N, where K is a constant. In Step 404, the revision factor KMP for the basic fuel volume TP, based on the signal for the concentration of oxygen in the exhaust gas, is calculated by the injection correction means 48, and a fuel injection pulse width is calculated by the equation of Ti=Tp×KMP.

Next, in Step 405, a determination is made as to whether a flag FL, which indicates the program step, is initialized to 0, and if FL=0, then the program proceeds to Step 406. Here, when the supercharging pressure P is determined to be less than the upper limit value Pmax by a fuel cutoff discrimination means 45, the program proceeds to Step 407, where the fuel injection pulse signal Ti is outputted to the injection valve 7 through the output processing means 46.

When, in Step 406, the supercharging pressure P is greater than the upper limit value Pmax, the program proceeds to Step 408, where the output of the injection signal Ti from the output processing device 46 causes the fuel to be cut off by closing the injection valve 7. The flag FL is then sec to 1 in Step 409.

Accordingly, if the flag FL is set to 0 in Step 409, the fuel injection is cut off, and because it is known that the supercharging pressure is in the process of dropping, next, in Step 410, the fuel cutoff discrimination means 45 determines whether or not the supercharging pressure P has dropped below the lower limit value Pmin. If it is below, the program proceeds to Step 411, where an output signal instructing that fuel should once more be provided to the injection valve 7 is outputted through the output processing device 46, and the flag FL is reset to 0 in Step 412.

If the supercharging pressure P does not fall below the lower limit value P min, the output from the injection signal Ti is cut by the output processing device 46, and the injection valve 7 is opened.

Finally, in Step 414, the action of the controller 41 is terminated.

Each type of set value, such as the previously mentioned KMR is stored in the memory 47.

Accordingly, it will be noted that the fuel cutoff discrimination means 45, which forms part of the controller 41, constitutes the fuel cutoff means of the present invention.

The fuel supply means is not limited to an electronically controlled type of injection valve, but may also be a carburetor system.

In this embodiment of the present invention, it would also be acceptable if the velocity control device 31 and the bypass valve control device 22 were to control the fuel injection volume of the injection valve 7, calculate the optimum degree of valve-opening in the controller 41 through the degree of valve-opening calculating device 49, and carry out electronic control through the output processing device 50. That is, a three-way solenoid valve 51 may be positioned in the pressure channel 34 of the velocity control device 31, while a three-way solenoid valve 52 of the same type may be positioned in the pressure channel 24 of the bypass valve control device 22. The three-way solenoid valves 51 and 52 dilute the introduced exhaust gas with air and then introduce the mixture into the respective diaphragm device 33 and 25. Based on a fixed frequency pulse, it is possible to provide electronic feed back control to change the volume of the dilution air and to apply electronic feedback control to the opening degree of the velocity control device 31 and of the bypass valve control device 22, by means of a current value or the length of time electricity is applied.

The adjustment of the degree of valve-opening of the bypass valve control device 22 and the velocity control device 31 is not limited to being carried out by a diaphragm device. Use of a pulse motor is also acceptable.

In summary, according to the present invention, a velocity control device for exhaust gas flow and a bypass valve control device are used. The set value at which the velocity control device for exhaust gas flow opens is smaller than that for the bypass control valve means, and when the supercharging pressure becomes larger than a fixed set value, the fuel supply is cut by means of a fuel cutoff means, so that, compared with the independent installation of the velocity control device for exhaust gas flow or of the bypass valve control device can be relied upon to perform the function of preventing an excessive rise in the supercharging pressure.

In addition, because the bypass valve control device can also be relied upon to carry out the function of lowering the supercharging pressure of the fuel cutoff device, by means of the velocity control device for exhaust gas flow and the bypass valve control device, the control of the supercharing pressure can be carried out on the comparatively high supercharging pressure side. For this reason, a high supercharging pressure can be provided over the entire operating range. The supercharging pressure in the low load region can be increased, and an increase in output is provided in that same region which is one of the problems of this exhaust gas supercharger. Also, by controlling the flow rate of the exhaust gas by the action of the bypass valve control device to control the exhaust gas flow velocity on the lower super charging pressure side, the frequency of action of the bypass valve control device becomes low, and the durability of the bypass control valve device is improved, and the stability of the supercharging pressure control is increased while, at the same time, as a result of the inertia immediately after the bypass control valve device opens the valve, the possiblity of excess rotation becomes small, and the development of knocking is controlled, and the possibility of back pressure variation also becomes small, it is possible to provide protection of the exhaust gas system. Further, when the action of the velocity control device for exhaust gas flow is faulty or impossible, the bypass valve control device which is positioned upstream of the exhaust gas flow velocity control device acts as a safety device and from its functioning, the safety of the engine system can be provided.

Various modifications will become possible for those skilled in the art after receiving the teachings of the present disclosure without departing from the scope thereof.

What is claimed is:

1. An internal combustion engine comprising:
  an exhaust gas turbocharger means, comprising a compressor means and an exhaust gas turbine means for rotating said compressor means, for supercharging intake air to the internal combustion engine;
  a fuel supply means having an injection valve means for injecting fuel;
  a bypass channel means for permitting exhaust gas to bypass said exhaust gas turbine;
  a supercharging pressure control device means for controlling a supercharging pressure downstream of said compressor means in conformance with an engine comprising:
    a bypass control valve means for increasing the flow of exhaust gas to pass through said bypass channel means when the supercharging pressure downstream of said compressor means exceeds a first set value;

a velocity control device means for controlling the exhaust gas flow comprising a throttle valve means for decreasing a velocity of the exhaust gas flowing through said exhaust gas turbine when the supercharging pressure downstream of said compressor means exceeds a second set value less than said first set value;

a pressure sensor means for detecting the supercharging pressure downstream from said compressor means; and a controller comprising a fuel cutoff control means for de-activating said fuel supply means when said pressure sensor means detects a rise in supercharging pressure above a third set value greater than said first set value, and for re-activating said fuel supply means when said pressure sensor means detects a reduction in the supercharging pressure below a fourth set value less than said first set value.

2. The internal combustion engine as claimed in claim 1, further comprising an exhaust gas channel between an inlet port of said bypass channel and said exhaust gas turbine;

and wherein said velocity control device means is positioned in said exhaust gas channel.

3. The internal combustion engine as claimed in claim 1, in which said throttle valve means of the velocity control device means has a degree of opening which is increased when the supercharging pressure downstream from said compressor means rises above said second set value.

4. The internal combustion engine as claimed in claim 1, further comprising a detection means for outputting operating status signal indicative of a rotating speed of the internal combustion engine, an amount of intake air into the internal combustion engine, and an oxygen content in the exhaust gas, to said controller.

5. The internal combustion engine as claimed in claim 1, wherein said controller means comprises a memory means for storing a plurality of set values and a calculating means for calculating a desired amount of fuel for the injection valve.

6. The internal combustion engine of claim 1, wherein said exhaust gas turbine is rotated by exhaust gas energy.

7. The internal combustion engine of claim 1, wherein said bypass control valve means is closed when the supercharging pressure is below said first set value and is opened when the supercharging pressure exceeds said first set value.

8. The internal combustion engine of claim 7, wherein said bypass control valve means comprises a diaphragm means for adjusting a degree of opening of said bypass channel means as a function of a first pressure downstream of said compressor means exerted on a first side of side diaphragm means and a second predetermined pressure, opposite said first pressure, exerted on a second side of said diaphragm means.

9. The internal combustion engine of claim 3, wherein said velocity control device means comprises a diaphragm means for adjusting a degree of opening of said throttle valve means as a function of a first pressure, downstream of said compressor means, exerted on a first side of said diaphragm means, and a second predetermined pressure exerted on a second side of said diaphragm means.

10. The internal combustion engine as claimed in claim 9, wherein said second predetermined force is exerted by a spring means normally biased for reducing a cross-sectional area of an intake port section of said exhaust gas turbine means, thereby increasing a velocity of the exhaust gas; and wherein the supercharging pressure downstream of said compressor means opposes said normal bias so as to enlarge the cross-sectional area, thereby decreasing the velocity of the exhaust gas.

11. The internal combustion engine as claimed in claim 8, further comprising a spring means normally biased to close said diaphragm means, wherein when said pressure downstream of said compressor means exceeds a biasing force of said spring means, said diaphragm is opened.

12. The internal combustion engine as claimed in claim 8, wherein said bypass control valve means comprises a pressure duct means for communicating said supercharging pressure downstream of said compressor means, and further comprises a three-way solenoid valve means installed in said pressure duct and having an air introducing means for introducing a predetermined amount of air into said pressure duct for diluting the pressure in order to control an amount of valve opening.

13. The internal combustion engine as claimed in claim 9, wherein said velocity control device means comprises a pressure duct means for communicating said supercharging pressure downstream of said compressor means, and further comprises a three-way solenoid valve means installed in said pressure duct and having an air introducing means for introducing a predetermined amount of air into said pressure duct for diluting the pressure in order to control an amount of valve opening.

* * * * *